(12) United States Patent
Lim et al.

(10) Patent No.: US 9,813,934 B2
(45) Date of Patent: Nov. 7, 2017

(54) WIRELESS DEVICE FOR SUPPORTING CELLULAR COMMUNICATIONS AND D2D COMMUNICATIONS

(71) Applicant: LG ELECTRONICS INC., Seoul (KR)

(72) Inventors: Suhwan Lim, Seoul (KR); Sangwook Lee, Seoul (KR); Jongkil Shin, Seoul (KR); Dongik Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/154,889

(22) Filed: May 13, 2016

(65) Prior Publication Data

US 2016/0337894 A1 Nov. 17, 2016

Related U.S. Application Data

(60) Provisional application No. 62/162,585, filed on May 15, 2015.

(30) Foreign Application Priority Data

May 13, 2016 (KR) .................. 10-2016-0058533

(51) Int. Cl.
| | |
|---|---|
| H04W 4/00 | (2009.01) |
| H04W 28/02 | (2009.01) |
| H04L 5/14 | (2006.01) |
| H04B 7/26 | (2006.01) |
| H04W 48/08 | (2009.01) |

(Continued)

(52) U.S. Cl.
CPC ........ H04W 28/0215 (2013.01); H04B 7/265 (2013.01); H04L 5/0062 (2013.01); H04L 5/0073 (2013.01); H04L 5/1461 (2013.01); H04W 48/08 (2013.01); H04W 88/06 (2013.01)

(58) Field of Classification Search
CPC .............. H04W 28/0215; H04W 48/08; H04L 5/1464; H04L 5/0073; H04L 5/0062; H04B 7/265
USPC .................. 370/312, 328–330, 335–348
See application file for complete search history.

(56) References Cited

U.S. PATENT DOCUMENTS 9,084,251 B2 * 7/2015 Beale .................. H04W 72/042
2012/0293265 A1 * 11/2012 Heikkinen .............. H03F 1/565
330/291

(Continued)

*Primary Examiner* — Thai Hoang
(74) *Attorney, Agent, or Firm* — Lee, Hong, Degerman, Kang & Waimey

(57) ABSTRACT

One disclosure of the present specification provides a wireless device for supporting a first band for cellular communications and a second band for D2D communications. The wireless device may comprising: a main antenna; a first RF chain configured to process a first transmission signal and a second transmission signal wherein the first and second transmission signals are to be transmitted via the main antenna using uplink bands of the first and second bands respectively; a second RF chain configured to process a first reception signal, wherein the first reception signal is received via the main antenna using an uplink band of the second band; a third RF chain configured to process a second reception signal, wherein the second reception signal is received via the main antenna using a downlink band of the first band.

7 Claims, 25 Drawing Sheets

(51) Int. Cl.
*H04L 5/00* (2006.01)
*H04W 88/06* (2009.01)

(56) References Cited

U.S. PATENT DOCUMENTS

| | | | |
|---|---|---|---|
| 2012/0322484 A1* | 12/2012 | Yu | H04W 4/08 |
| | | | 455/509 |
| 2013/0230026 A1* | 9/2013 | Kwon | H04W 76/023 |
| | | | 370/336 |
| 2015/0148030 A1* | 5/2015 | Seo | H04L 5/001 |
| | | | 455/426.1 |
| 2015/0215887 A1* | 7/2015 | Nejatian | H04W 56/0045 |
| | | | 370/350 |
| 2016/0072712 A1* | 3/2016 | Gao | H04L 5/0051 |
| | | | 370/230 |
| 2017/0013655 A1* | 1/2017 | Martin | H04W 72/085 |

* cited by examiner

WIRELESS DEVICE FOR SUPPORTING CELLULAR COMMUNICATIONS AND D2D COMMUNICATIONS

CROSS-REFERENCE TO RELATED APPLICATIONS

Pursuant to 35 U.S.C. §119, this application claims the benefit of earlier filing date and right of priority to Korean patent application No. 10-2016-0058533, filed on May 13, 2016, and also claims the benefit of U.S. Provisional application No. 62/162,585, filed on May 15, 2015, the contents of which are all hereby incorporated by reference herein in their entirety.

BACKGROUND OF THE INVENTION

Field of the Invention

The present invention relates to mobile communications.

Related Art

3GPP 3rd Generation Partnership Project LTE Long Term Evolution that is an advancement of UMTS Universal Mobile Telecommunication System is being introduced with 3GPP release 8. In 3GPP LTE, OFDMA orthogonal frequency division multiple access is used for downlink, and SC-FDMA single carrier-frequency division multiple access is used for uplink. Further, in order to cope with a rapidly increasing data traffic in 3GPP LTE-A LTE-Advanced as an evolution of 3GPP LTE, carrier aggregation CA has been introduced which may aggregate up to five carriers.

On the other hand, D2D communications device-to-device communication may be a distributed communications technique where data traffics are communicated between adjacent wireless nodes. In the D2D communications, a wireless node such as a mobile phone may search for another physically adjacent wireless node on its own, and, if there is a physically adjacent wireless node, may set a communications session, and then, may send the data traffic to the physically adjacent wireless node. As the D2D communications, Bluetooth or WiFi Direct may support direct communications between the wireless nodes without use of a base station. Further, the D2D communications may be possible where scheduling for the D2D communications may be managed by a base station. Such D2D communications managed by the base station may distribute data traffics which otherwise be concentrated on the base station, to reduce traffic overloads.

However, the LTE/LTE-A based cellular communications and D2D communications between the wireless nodes may interfere with each other.

SUMMARY OF THE INVENTION

Accordingly, disclosures of the specification have been made in an effort to solve the aforementioned problem To achieve the foregoing aspect, one embodiment of the present invention provides a wireless device for supporting a first band for LTE (Long Term Evolution)/LTE-A (LTE-Advanced) based cellular communications and a second band for D2D (Device to Device) communications. The wireless device may comprising: a main antenna; a first RF (Radio Frequency) chain configured to process a first transmission signal and a second transmission signal wherein the first and second transmission signals are to be transmitted via the main antenna using uplink bands of the first and second bands respectively; a second RF chain configured to process a first reception signal, wherein the first reception signal is received via the main antenna using an uplink band of the second band; a third RF chain configured to process a second reception signal, wherein the second reception signal is received via the main antenna using a downlink band of the first band; a switch disposed between the first RF chain and the second RF chain for selecting one between the transmission signal associated with the first RF chain and the reception signal associated with the second RF chain; and a first duplexer coupled to the switch, the third RF chain and the main antenna for enabling separation between the signal using the first band and the signal using the second band.

The wireless device may further comprising: a diversity antenna; a fourth RF chain configured to process a third reception signal wherein the third reception signal is received via the diversity antenna using the uplink band of the second band; a fifth RF chain configured to process a fourth reception signal wherein the fourth reception signal is received via the diversity antenna using the downlink band of the first band; and a second duplexer coupled to the fourth RF chain, the fifth RF chain and the diversity antenna for enabling separation between the signal using the first band and the signal using the second band.

The wireless device may further comprising: a one of a quadplexer, a triplexer and a hexplexer instead of the second duplexer based on aggregated bands according to carrier aggregation of the cellular communications.

The switch is configured to operate based on a TDD (Time Division Duplex) scheme.

The first RF chain include a power amplifier to be configured to amplify the first transmission signal and second transmission signal.

The uplink band of the second band has an inter-band relationship with the uplink band of the first band.

Each of the second transmission signal and the first reception signal contains a discovery signal on a PSDCH (Physical Sidelink Discovery Channel).

In accordance with the present disclosure, the wireless device supporting the carrier aggregation CA may enable efficient D2D communications.

BRIEF DESCRIPTION OF THE DRAWINGS

FIG. 13A illustrates one example where D2D communications and WAN communications bands are the same as each other, while

DESCRIPTION OF EXEMPLARY EMBODIMENTS

Figure 1:
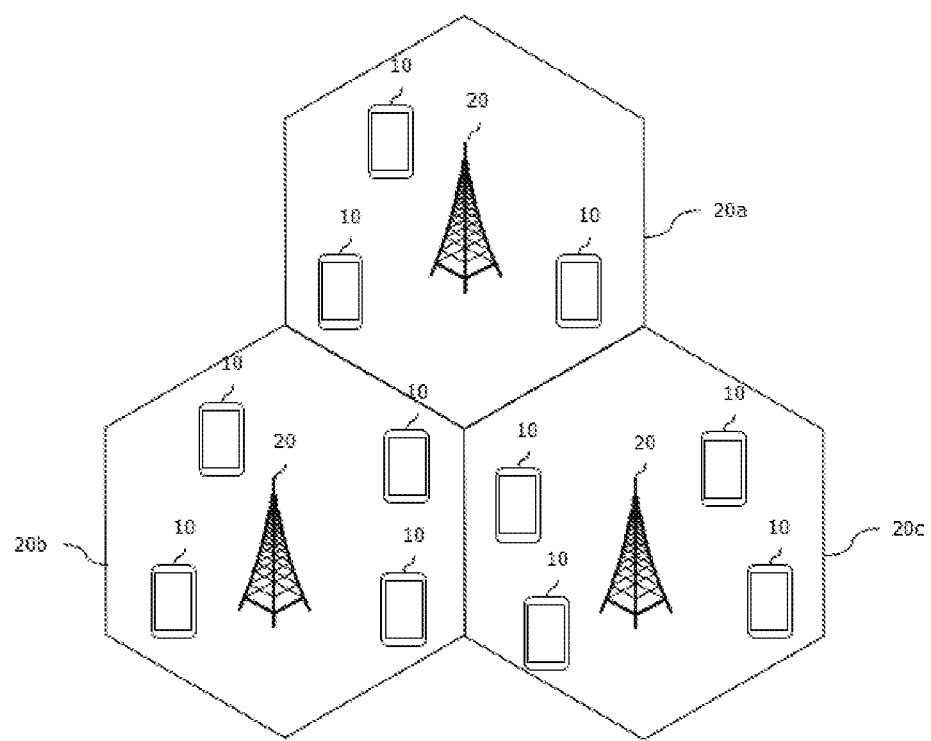
FIG. 1 illustrates a wireless communication system.

Hereinafter, applications of the present invention based on 3GPP 3rd generation partnership project LTE long term evolution or 3GPP LTE-A advanced are described. However, this is merely an example, and the present invention may apply to various wireless communication systems. Hereinafter, LTE includes LTE and/or LTE-A.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner. The expression of the singular number in the specification includes the meaning of the plural number unless the meaning of the singular number is definitely different from that of the plural number in the context.

In the following description, the term 'include' or 'have' may represent the existence of a feature, a number, a step, an operation, a component, a part or the combination thereof described in the specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings. As used herein, 'BS (base station)' generally refers to a fixed station that communicates with a wireless device and may be denoted by other terms such as eNB evolved-NodeB, BTS base transceiver system, or access point.

As used herein, 'UE (user equipment)' may be stationary or mobile, and may be denoted by other terms such as terminal, MT (mobile terminal), ME (mobile equipment), MS (mobile station), UT (user terminal), SS (subscriber station), handheld device, or AT (access terminal).

FIG. 1 illustrates a wireless communication system.

The wireless communication system includes at least one base station BS 20. Respective BSs 20 provide a communication service to particular geographical areas 20a, 20b, and 20c which are generally called cells. Each cell may be divided into a plurality of areas which are called sectors.

The terminal generally belongs to one cell and the cell to which the terminal belong is referred to as a serving cell. A base station that provides the communication service to the serving cell is referred to as a serving BS. Since the wireless communication system is a cellular system, another cell that neighbors to the serving cell is present. Another cell which neighbors to the serving cell is referred to a neighbor cell. A base station that provides the communication service to the neighbor cell is referred to as a neighbor BS. The serving cell and the neighbor cell are relatively decided based on the terminal.

Hereinafter, a downlink means communication from the base station 20 to the terminal 10 and an uplink means communication from the terminal 10 to the base station 20. In the downlink, a transmitter may be a part of the base station 20 and a receiver may be a part of the terminal 10. In the uplink, the transmitter may be a part of the terminal 10 and the receiver may be a part of the base station 20.

Hereinafter, the LTE system will be described in detail.

Figure 2:
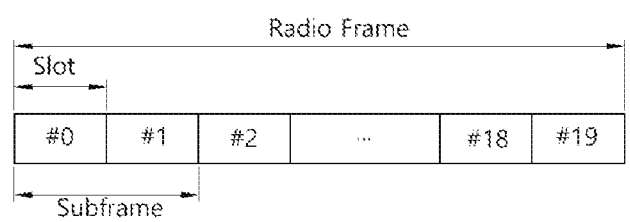
FIG. 2 illustrates the architecture of a radio frame according to FDD in 3GPP LTE.

FIG. 2 illustrates the architecture of a radio frame according to FDD in 3GPP LTE. For the radio frame shown in FIG. 2, 3GPP (3rd Generation Partnership Project) TS 36.211 V8.2.0 2008-03 "Technical Specification Group Radio Access Network; Evolved Universal Terrestrial Radio Access (E-UTRA); Physical channels and modulation Release 8", Ch. 5 may be referenced.

Referring to FIG. 2, the radio frame consists of 10 sub-frames, and each sub-frame includes two slots. The slots in the radio frame are numbered with slot numbers 0 to 19. The time taken for one sub-frame to be transmitted is denoted TTI transmission time interval. The TTI may be a scheduling unit for data transmission. For example, the length of one radio frame is 10 ms, the length of one sub-frame is 1 ms, and the length of one slot may be 0.5 ms.

The architecture of radio frame is merely an example, and the number of sub-frames in the radio frame or the number of slots in each sub-frame may be changed variously.

Meanwhile, one slot may include a plurality of OFDM symbols. How many OFDM symbols are included in one slot may vary depending on cyclic prefix CP.

Figure 3:
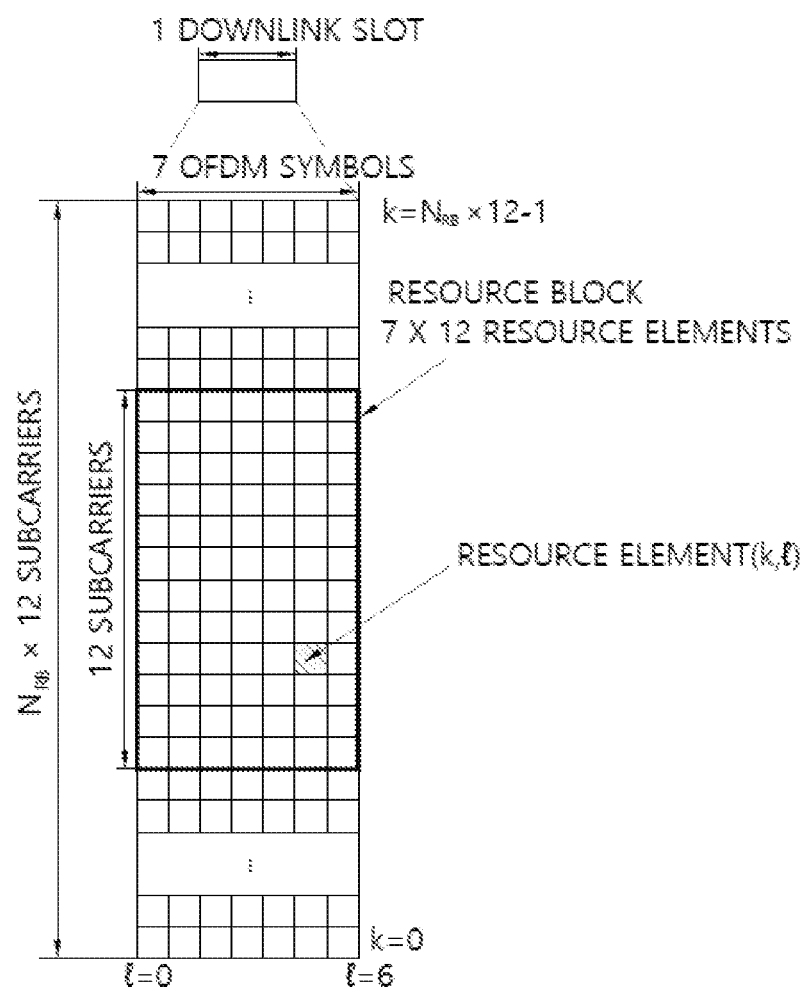
FIG. 3 illustrates an example resource grid in 3GPP LTE.

FIG. 3 illustrates an example resource grid in 3GPP LTE.

Referring to FIG. 3, the uplink slot includes a plurality of OFDM orthogonal frequency division multiplexing symbols in the time domain and NRB resource blocks RBs in the frequency domain. For example, in the LTE system, the number of resource blocks RBs, i.e., NRB, may be one from 6 to 110.

Here, by way of example, one resource block includes 7×12 resource elements that consist of seven OFDM symbols in the time domain and 12 sub-carriers in the frequency domain. However, the number of sub-carriers in the resource block and the number of OFDM symbols are not limited thereto. The number of OFDM symbols in the resource block or the number of sub-carriers may be changed variously. In other words, the number of OFDM symbols may be varied depending on the above-described length of CP. In particular, 3GPP LTE defines one slot as having seven OFDM symbols in the case of CP and six OFDM symbols in the case of extended CP.

OFDM symbol is to represent one symbol period, and depending on system, may also be denoted SC-FDMA symbol, OFDM symbol, or symbol period.

The resource block is a unit of resource allocation and includes a plurality of sub-carriers in the frequency domain. The number of resource blocks included in the uplink slot, i.e., NUL, is dependent upon an uplink transmission bandwidth set in a cell. Each element on the resource grid is denoted resource element.

Meanwhile, the number of sub-carriers in one OFDM symbol may be one of 128, 256, 512, 1024, 1536, and 2048.

In 3GPP LTE, the resource grid for one uplink slot shown in FIG. 3 may also apply to the resource grid for the downlink slot.

Figure 4:
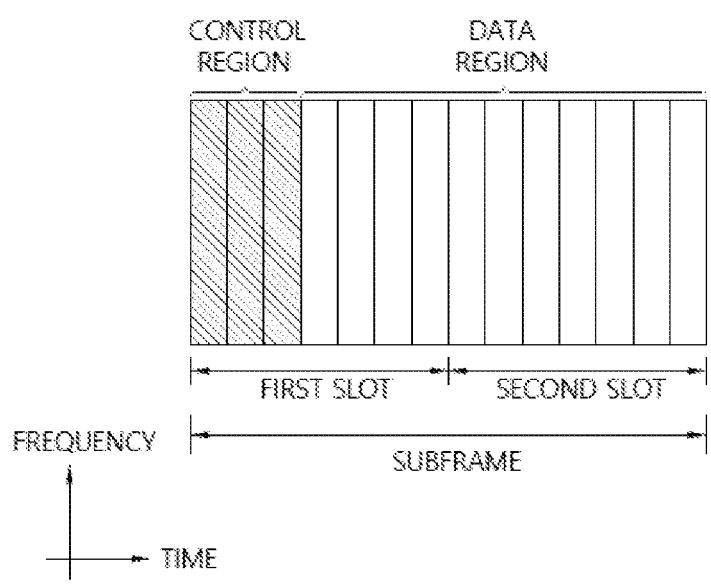
FIG. 4 illustrates the architecture of a downlink sub-frame in 3GPP LTE.

FIG. 4 illustrates the architecture of a downlink sub-frame in 3GPP.

For this, 3GPP TS 36.211 V10.4.0 2011-12 "Evolved Universal Terrestrial Radio Access (E-UTRA); Physical Channels and Modulation Release 10", Ch. 4 may be referenced.

The radio frame includes 10 sub-frames indexed 0 to 9. One sub-frame includes two consecutive slots. Accordingly, the radio frame includes 20 slots. The time taken for one sub-frame to be transmitted is denoted TTI transmission time interval. For example, the length of one sub-frame may be 1 ms, and the length of one slot may be 0.5 ms.

One slot may include a plurality of OFDM orthogonal frequency division multiplexing symbols in the time domain. OFDM symbol is merely to represent one symbol period in the time domain since 3GPP LTE adopts OFDMA orthogonal frequency division multiple access for downlink DL, and the multiple access scheme or name is not limited thereto. For example, the OFDM symbol may be referred to as SC-FDMA single carrier-frequency division multiple access symbol or symbol period.

In FIG. 4, assuming the normal CP, one slot includes seven OFDM symbols, by way of example. However, the number of OFDM symbols included in one slot may vary depending on the length of CP cyclic prefix. That is, as described above, according to 3GPP TS 36.211 V10.4.0, one slot includes seven OFDM symbols in the normal CP and six OFDM symbols in the extended CP.

Resource block RB is a unit for resource allocation and includes a plurality of sub-carriers in one slot. For example, if one slot includes seven OFDM symbols in the time domain and the resource block includes 12 sub-carriers in the frequency domain, one resource block may include 7×12 resource elements REs.

The DL downlink sub-frame is split into a control region and a data region in the time domain. The control region includes up to first three OFDM symbols in the first slot of the sub-frame. However, the number of OFDM symbols included in the control region may be changed. A PDCCH physical downlink control channel and other control channels are assigned to the control region, and a PDSCH is assigned to the data region.

As set forth in 3GPP TS 36.211 V10.4.0, the physical channels in 3GPP LTE may be classified into data channels such as PDSCH physical downlink shared channel and PUSCH physical uplink shared channel and control channels such as PDCCH physical downlink control channel, PCFICH physical control format indicator channel, PHICH physical hybrid-ARQ indicator channel and PUCCH physical uplink control channel.

The PCFICH transmitted in the first OFDM symbol of the sub-frame carries CIF control format indicator regarding the number i.e., size of the control region of OFDM symbols used for transmission of control channels in the sub-frame. The wireless device first receives the CIF on the PCFICH and then monitors the PDCCH.

Unlike the PDCCH, the PCFICH is transmitted through a fixed PCFICH resource in the sub-frame without using blind decoding.

The PHICH carries an ACK positive-acknowledgement/NACK negative-acknowledgement signal for a UL HARQ hybrid automatic repeat request. The ACK/NACK signal for UL uplink data on the PUSCH transmitted by the wireless device is sent on the PHICH.

The PBCH physical broadcast channel is transmitted in the first four OFDM symbols in the second slot of the first sub-frame of the radio frame. The PBCH carries system information necessary for the wireless device to communicate with the base station, and the system information transmitted through the PBCH is denoted MIB master information block. In comparison, system information transmitted on the PDSCH indicated by the PDCCH is denoted SIB system information block.

The PDCCH may carry activation of VoIP voice over internet protocol and a set of transmission power control commands for individual UEs in some UE group, resource allocation of an upper layer control message such as a random access response transmitted on the PDSCH, system information on DL-SCH, paging information on PCH, resource allocation information of UL-SCH uplink shared channel, and resource allocation and transmission format of DL-SCH downlink-shared channel A plurality of PDCCHs may be sent in the control region, and the terminal may monitor the plurality of PDCCHs. The PDCCH is transmitted on one CCE control channel element or aggregation of some consecutive CCEs. The CCE is a logical allocation unit used for providing a coding rate per radio channel's state to the PDCCH. The CCE corresponds to a plurality of resource element groups. Depending on the relationship between the number of CCEs and coding rates provided by the CCEs, the format of the PDCCH and the possible number of PDCCHs are determined.

The control information transmitted through the PDCCH is denoted downlink control information DCI. The DCI may include resource allocation of PDSCH this is also referred to as DL downlink grant, resource allocation of PUSCH this is also referred to as UL uplink grant, a set of transmission power control commands for individual UEs in some UE group, and/or activation of VoIP Voice over Internet Protocol.

The base station determines a PDCCH format according to the DCI to be sent to the terminal and adds a CRC cyclic redundancy check to control information. The CRC is masked with a unique identifier RNTI; radio network temporary identifier depending on the owner or purpose of the PDCCH. In case the PDCCH is for a specific terminal, the terminal's unique identifier, such as C-RNTI cell-RNTI, may be masked to the CRC. Or, if the PDCCH is for a paging message, a paging indicator, for example, P-RNTI paging-RNTI may be masked to the CRC. If the PDCCH is for a system information block SIB, a system information identifier, SI-RNTI system information-RNTI, may be masked to the CRC. In order to indicate a random access response that is a response to the terminal's transmission of a random access preamble, an RA-RNTI random access-RNTI may be masked to the CRC.

In 3GPP LTE, blind decoding is used for detecting a PDCCH. The blind decoding is a scheme of identifying whether a PDCCH is its own control channel by demasking a desired identifier to the CRC cyclic redundancy check of a received PDCCH this is referred to as candidate PDCCH and checking a CRC error. The base station determines a PDCCH format according to the DCI to be sent to the wireless device, then adds a CRC to the DCI, and masks a unique identifier this is referred to as RNTI radio network temporary identifier to the CRC depending on the owner or purpose of the PDCCH.

According to 3GPP TS 36.211 V10.4.0, the uplink channels include a PUSCH, a PUCCH, an SRS Sounding Reference Signal, and a PRACH physical random access channel.

Figure 5:
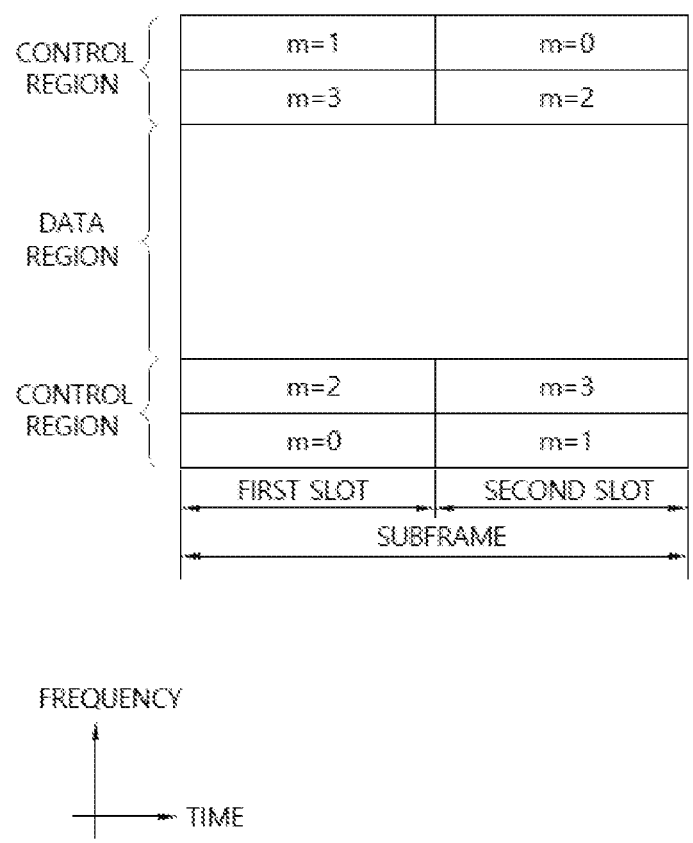
FIG. 5 illustrates the architecture of an uplink sub-frame in 3GPP LTE.

FIG. 5 illustrates the architecture of an uplink sub-frame in 3GPP LTE.

Referring to FIG. 6, the uplink sub-frame may be separated into a control region and a data region in the frequency domain. The control region is assigned a PUCCH physical uplink control channel for transmission of uplink control information. The data region is assigned a PUSCH physical uplink shared channel for transmission of data in some cases, control information may also be transmitted.

The PUCCH for one terminal is assigned in resource block RB pair in the sub-frame. The resource blocks in the resource block pair take up different sub-carriers in each of the first and second slots. The frequency occupied by the resource blocks in the resource block pair assigned to the PUCCH is varied with respect to a slot boundary. This is referred to as the RB pair assigned to the PUCCH having been frequency-hopped at the slot boundary.

The terminal may obtain a frequency diversity gain by transmitting uplink control information through different sub-carriers over time. m is a location index that indicates a logical frequency domain location of a resource block pair assigned to the PUCCH in the sub-frame.

The uplink control information transmitted on the PUCCH includes an HARQ hybrid automatic repeat request, an ACK acknowledgement/NACK non-acknowledgement, a CQI channel quality indicator indicating a downlink channel state, and an SR scheduling request that is an uplink radio resource allocation request.

The PUSCH is mapped with a UL-SCH that is a transport channel. The uplink data transmitted on the PUSCH may be a transport block that is a data block for the UL-SCH transmitted for the TTI. The transport block may be user information. Or, the uplink data may be multiplexed data. The multiplexed data may be data obtained by multiplexing the transport block for the UL-SCH and control information. For example, the control information multiplexed with the data may include a CQI, a PMI precoding matrix indicator, an HARQ, and an RI rank indicator. Or, the uplink data may consist only of control information.

Carrier Aggregation: CA

A carrier aggregation system is now described.

In the carrier aggregation CA system, a plurality of component carriers DL CC A to C, UL CC A to C may be assigned to the terminal. Component carrier CC means the carrier used in then carrier aggregation system and may be briefly referred as carrier. For example, three 20 MHz component carriers may be assigned so as to allocate a 60 MHz bandwidth to the terminal.

Cells may be classified into primary cells and secondary cells, serving cells.

The primary cell means a cell operating at a primary frequency. The primary cell is a cell where the terminal conducts an initial connection establishment procedure or connection re-establishment procedure with the base station or is a cell designated as a primary cell during the course of handover. The secondary cell means a cell operating at a secondary frequency. The secondary cell is configured once an RRC connection is established and is used to provide an additional radio resource.

Carrier aggregation systems may be classified into a contiguous carrier aggregation system in which aggregated carriers are contiguous and a non-contiguous carrier aggregation system in which aggregated carriers are spaced apart from each other. Hereinafter, when simply referring to a carrier aggregation system, it should be understood as including both the case where the component carrier is contiguous and the case where the control channel is non-contiguous. The number of component carriers aggregated between uplink and downlink may vary. When the number of downlink CCs is the same as the number of uplink CCs is denoted symmetric aggregation, and when the numbers differ from each other is denoted asymmetric aggregation.

Meanwhile, the carrier aggregation CA technologies, as described above, may be generally separated into an inter-band CA technology and an intra-band CA technology. The inter-band CA is a method that aggregates and uses CCs that are present in different bands from each other, and the intra-band CA is a method that aggregates and uses CCs in the same frequency band. Further, CA technologies are more specifically split into intra-band contiguous CA, intra-band non-contiguous CA, and inter-band non-contiguous CA.

Figure 6A:
FIG. 6A and FIG. 6B are a concept view illustrating intra-band carrier aggregation CA.
Figure 6B:
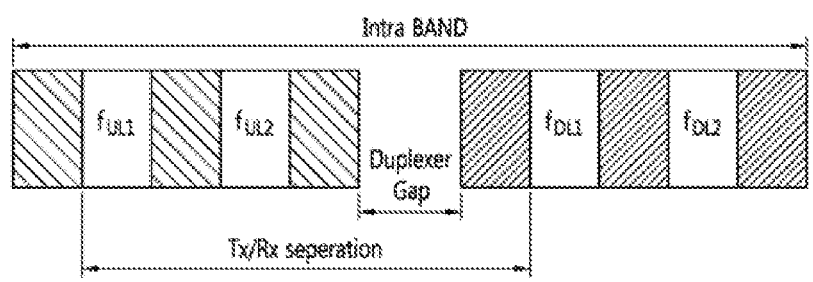

FIGS. 6A and 6B are a concept view illustrating intra-band carrier aggregation CA.

FIG. 6A illustrates intra-band contiguous CA, and FIG. 6B illustrates intra-band non-contiguous CA.

LTE-advanced adds various schemes including uplink MIMO and carrier aggregation in order to realize high-speed wireless transmission. The CA that is being discussed in LTE-advanced may be split into the intra-band contiguous CA shown in FIG. 6A and the intra-band non-contiguous CA shown in FIG. 6B.

Figure 7A:
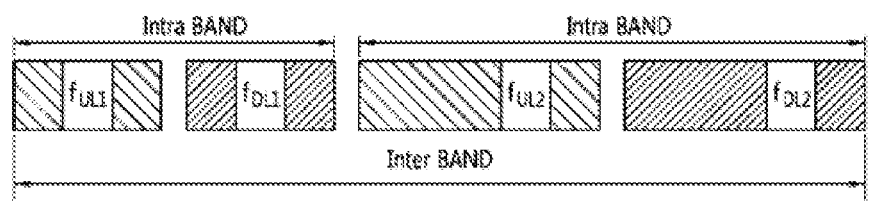
FIG. 7A and FIG. 7B are a concept view illustrating inter-band carrier aggregation.
Figure 7B:
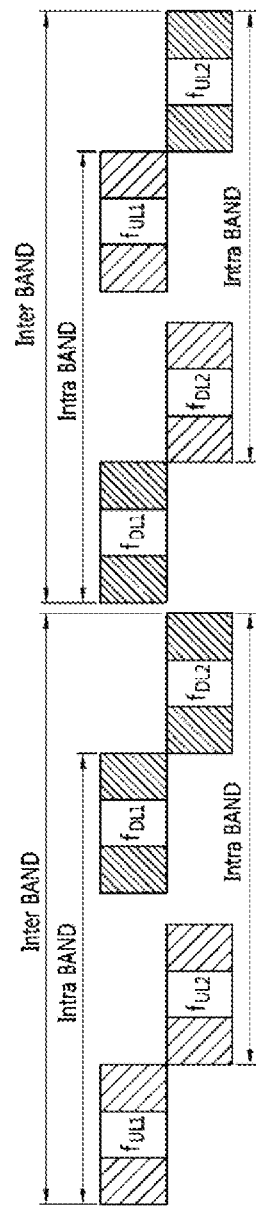

FIGS. 7A and 7B are a concept view illustrating inter-band carrier aggregation.

FIG. 7A illustrates a combination of a lower band and a higher band for inter-band CA, and FIG. 7B illustrates a combination of similar frequency bands for inter-band CA.

In other words, the inter-band carrier aggregation may be separated into inter-band CA between carriers of a low band and a high band having different RF characteristics of inter-band CA as shown in FIG. 7A and inter-band CA of similar frequencies that may use a common RF terminal per component carrier due to similar RF radio frequency characteristics as shown in FIG. 7B.

TABLE 1

| Operating Band | UL operating band $F_{UL\_low}$-$F_{UL\_high}$ | DL operating band $F_{DL\_low}$-$F_{DL\_high}$ | Duplex mode |
|---|---|---|---|
| 1 | 1920 MHz-1980 MHz | 2110 MHz-2170 MHz | FDD |
| 2 | 1850 MHz-1910 MHz | 1930 MHz-1990 MHz | FDD |
| 3 | 1710 MHz-1785 MHz | 1805 MHz-1880 MHz | FDD |
| 4 | 1710 MHz-1755 MHz | 2110 MHz-2155 MHz | FDD |
| 5 | 824 MHz-849 MHz | 869 MHz-894 MHz | FDD |
| 61 | 830 MHz-840 MHz | 875 MHz-885 MHz | FDD |
| 7 | 2500 MHz-2570 MHz | 2620 MHz-2690 MHz | FDD |
| 8 | 880 MHz-915 MHz | 925 MHz-960 MHz | FDD |
| 9 | 1749.9 MHz-1784.9 MHz | 1844.9 MHz-1879.9 MHz | FDD |
| 10 | 1710 MHz-1770 MHz | 2110 MHz-2170 MHz | FDD |
| 11 | 1427.9 MHz-1447.9 MHz | 1475.9 MHz-1495.9 MHz | FDD |
| 12 | 699 MHz-716 MHz | 729 MHz-746 MHz | FDD |
| 13 | 777 MHz-787 MHz | 746 MHz-756 MHz | FDD |
| 14 | 788 MHz-798 MHz | 758 MHz-768 MHz | FDD |
| 15 | Reserved | Reserved | FDD |
| 16 | Reserved | Reserved | FDD |
| 17 | 704 MHz-716 MHz | 734 MHz-746 MHz | FDD |
| 18 | 815 MHz-830 MHz | 860 MHz-875 MHz | FDD |
| 19 | 830 MHz-845 MHz | 875 MHz-890 MHz | FDD |
| 20 | 832 MHz-862 MHz | 791 MHz-821 MHz | FDD |
| 21 | 1447.9 MHz-1462.9 MHz | 1495.9 MHz-1510.9 MHz | FDD |
| 22 | 3410 MHz-3490 MHz | 3510 MHz-3590 MHz | FDD |
| 23 | 2000 MHz-2020 MHz | 2180 MHz-2200 MHz | FDD |
| 24 | 1626.5 MHz-1660.5 MHz | 1525 MHz-1559 MHz | FDD |
| 25 | 1850 MHz-1915 MHz | 1930 MHz-1995 MHz | FDD |
| 26 | 814 MHz-849 MHz | 859 MHz-894 MHz | FDD |
| 27 | 807 MHz-824 MHz | 852 MHz-869 MHz | FDD |
| 28 | 703 MHz-748 MHz | 758 MHz-803 MHz | FDD |
| 29 | N/A N/A | 717 MHz-728 MHz | FDD |
| 30 | 2305 MHz-2315 MHz | 2350 MHz-2360 MHz | FDD |
| 31 | 452.5 MHz-457.5 MHz | 462.5 MHz-467.5 MHz | FDD |
| 32 | N/A N/A | 1452 MHz-1496 MHz | FDD |
| ... | | | |
| 33 | 1900 MHz-1920 MHz | 1900 MHz-1920 MHz | TDD |
| 34 | 2010 MHz-2025 MHz | 2010 MHz-2025 MHz | TDD |
| 35 | 1850 MHz-1910 MHz | 1850 MHz-1910 MHz | TDD |
| 36 | 1930 MHz-1990 MHz | 1930 MHz-1990 MHz | TDD |
| 37 | 1910 MHz-1930 MHz | 1910 MHz-1930 MHz | TDD |
| 38 | 2570 MHz-2620 MHz | 2570 MHz-2620 MHz | TDD |
| 39 | 1880 MHz-1920 MHz | 1880 MHz-1920 MHz | TDD |
| 40 | 2300 MHz-2400 MHz | 2300 MHz-2400 MHz | TDD |
| 41 | 2496 MHz 2690 MHz | 2496 MHz 2690 MHz | TDD |
| 42 | 3400 MHz-3600 MHz | 3400 MHz-3600 MHz | TDD |
| 43 | 3600 MHz-3800 MHz | 3600 MHz-3800 MHz | TDD |
| 44 | 703 MHz-803 MHz | 703 MHz-803 MHz | TDD |

Meanwhile, the 3GPP LTE/LTE-A systems define operating bands for uplink and downlink as shown in Table 1 above. Four CA cases shown in FIG. 7 come from Table 1.

Here, FUL_low means the lowest frequency in the uplink operating bands. FUL_high means the highest frequency in the uplink operating bands. Further, FDL_low means the lowest frequency in the downlink operating bands, and FDL_high means the highest frequency in the downlink operating bands.

When the operating bands are defined as shown in Table 1, each nation's frequency distributing organization may assign specific frequencies to service providers in compliance with the nation's circumstances.

Figure 8:
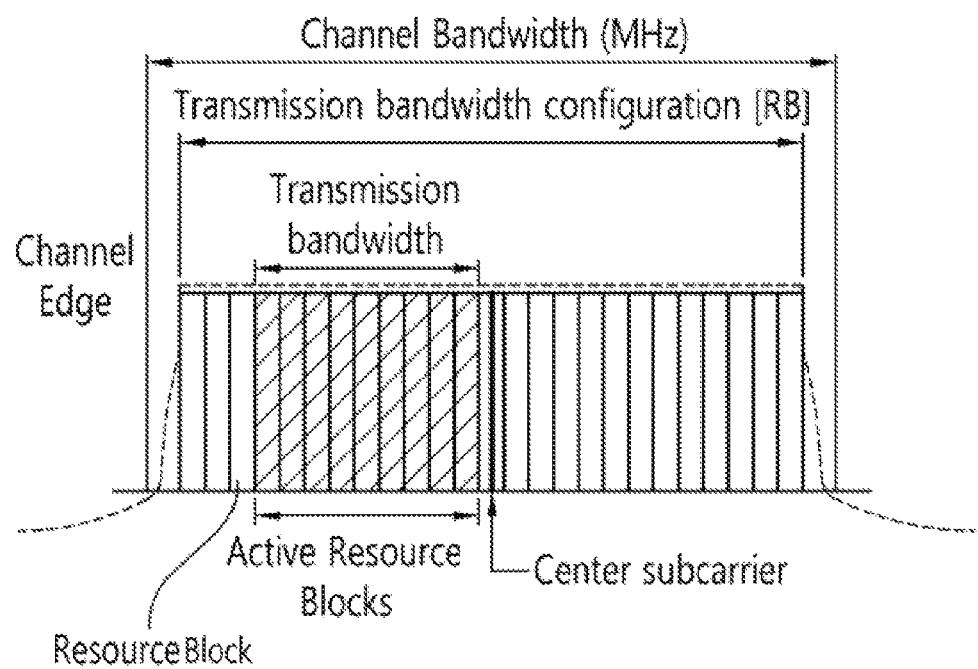
FIG. 8 illustrates a relationship between the resource block RB and channel band MHz.

FIG. 8 illustrates a relationship between the resource block RB and channel band MHz.

Here, the channel bandwidth is defined as can be seen from FIG. 14. That is, a transmission bandwidth is set to be smaller than the channel bandwidth BWChannel. The transmission bandwidth is set by a plurality of resource blocks RBs. The outer edges of the channel are the highest and lowest frequencies that are separated by the channel bandwidth.

Meanwhile, as described above, the 3GPP LTE system supports channel bandwidths of 1.4 MHz, 3 MHz, 5 MHz, 10 MHz, 15 MHz, and 20 MHz. The relationship between such channel bandwidths and the number of resource blocks is as below.

TABLE 2

| | Channel bandwidth $BW_{Channel}$ [MHz] | | | | | |
|---|---|---|---|---|---|---|
| | 1.4 | 3 | 5 | 10 | 15 | 20 |
| Transmission bandwidth settings NRB | 6 | 15 | 25 | 50 | 75 | 100 |

Addition of Small Cells

Meanwhile, in a next-generation mobile communications system, in order to deal with data traffics, a small cell with a small coverage is expected to add into a coverage of an existing cell. Since the existing cell has a coverage larger than that of the small cell, the existing cell is referred to as a macro cell. Hereinafter, a reference will be made to FIG. 9.

Figure 9:
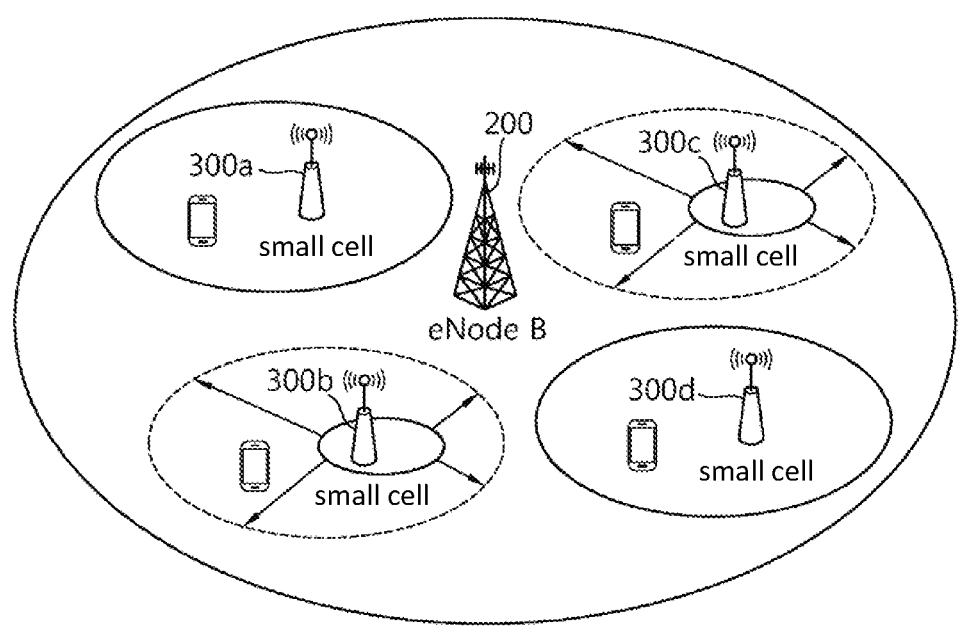
FIG. 9 illustrates a hybrid network environment where macro cells and small cells are mixed.

FIG. 9 illustrates a hybrid network environment where macro cells and small cells are mixed.

Referring to FIG. 9, a hybrid network environment is shown where a macro cell formed by an existing base station 200 is mixed with small cells formed by at least one small base stations 300a, 300b, 300c, and 300d. The existing base station 200 provides a larger coverage than that of each of the small base station. Thus, the existing base station 200 may be referred to as a macro base station or macro eNodeB (MeNB). Herein, the macro cell and macro base station may be used exchangeably. The UE (user equipment) coupled to the macro cell 200 may be referred to as a macro UE. The macro UE may receive a downlink signal from the macro base station, and may send an uplink signal to the macro base station.

In such a hybrid network, the macro cell may be set to be a primary cell (Pcell), and the small cell may be set to be a secondary cell (Scell), thereby to supplement the coverage for the macro cell. In an alternative, the small cell may be set to be a primary cell (Pcell), and the macro cell may be set to be a secondary cell (Scell), thereby to boost an overall performance of the network.

D2D (Device to Device) Communications

Hereinafter, D2D communications will be described with reference to FIG. 10.

Figure 10:
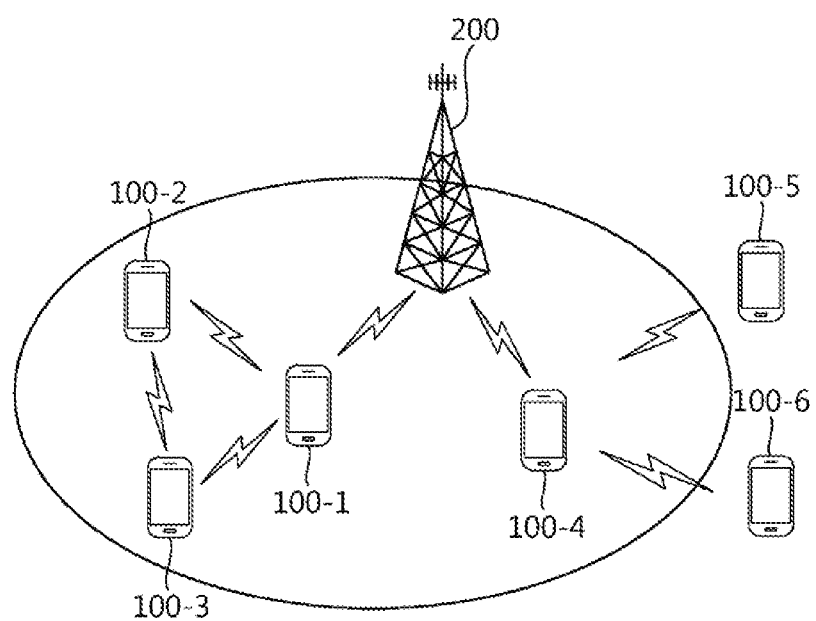
FIG. 10 illustrates a concept of D2D Device to Device communications.

FIG. 10 illustrates a concept of D2D (Device to Device) communications. As a user demand for SNS (Social Network Service) is increasing, communication between physically close UEs, that is, D2D (Device to Device) communications may be required.

Via the D2D communications, as shown in FIG. 10, direct communications between a first UE 100-1, a second UE 100-2, and a third UE 100-3, or direct communications between a fourth UE 100-4, a fifth UE 100-5, and a sixth UE 100-6 may occur without use of the base station eNodeB 200. Of course, using the base station eNodeB 200, communications between the first UE 100-1 and fourth UE 100-4 may occur. Further, the first UE 100-1 may act as a repeater for the second UE 100-2, and third UE 100-3. Similarly, the fourth UE 100-4 may act as a repeater for the fifth UE 100-5, and sixth UE 100-6 remote from a center of the macro cell.

A link between the UEs used for the D2D communications may be referred to as a sidelink.

Figure 11:
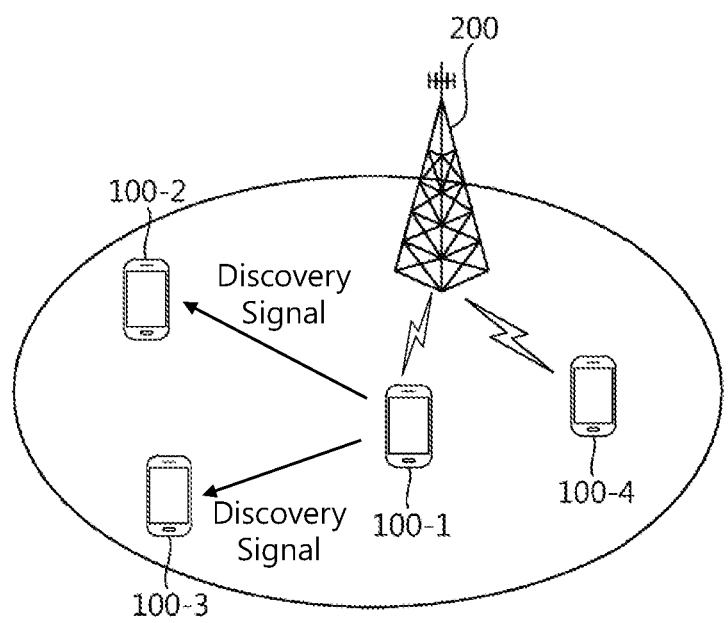
FIG. 11 illustrates one example of sending discovery signals for D2D communications.

Physical channels used for the sidelink may include followings:

PSSCH Physical Sidelink Shared Channel
PSCCH Physical Sidelink Control Channel
PSDCH Physical Sidelink Discovery Channel
PSBCH Physical Sidelink Broadcast Channel FIG. 11 illustrates one example of sending discovery signals for D2D communications.

As shown in FIG. 11, in order that the first UE 100-1 determines whether an UE suitable for the D2D communications is present nearby the first UE 100-1, the first UE 100-1 may be configured to send a discovery signal. Further, in order that the first UE 100-1 inform the second UE 100-2 and third UE 100-3 nearby the first UE 100-1 that the first UE 100-1 is present nearby the second UE 100-2 and third UE 100-3, the first UE 100-1 may be configured to send a discovery signal.

Problems when D2D Communications and Cellular Communications Coexist

The D2D communications between the UEs and cellular communications between the UE and base station may interfere with each other. This will be described below in details with reference to FIG. 12. The cellular communications may enable remote communications compared to the D2D communications. Thus, hereinafter, the cellular communications may be referred to as a WAN (Wide Area Network) communications.

Figure 12:
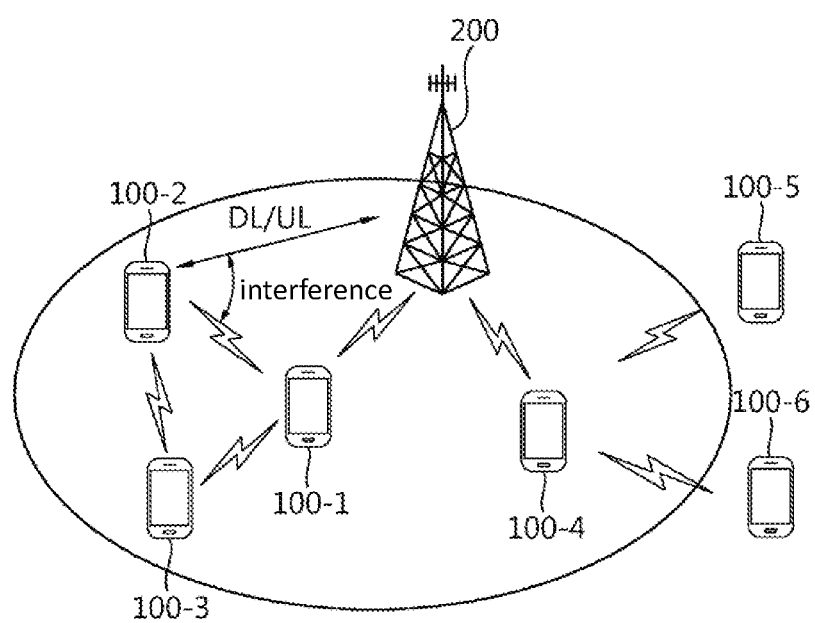
FIG. 12 illustrates one example of interferences between D2D communications and WAN Wide Area Network communications.

FIG. 12 illustrates one example of interferences between D2D communications and WAN Wide Area Network communications.

As shown in FIG. 12, the D2D communications between the second UE 100-2 and first UE 100-1 and WAN communications between the second UE 100-2 and base station 200 may interfere with each other.

In particular, uplink signal transmission to the base station 200 and downlink signal reception from the base station 200 based on the WAN communications may have an influence on the D2D communications. Further, signal transmission or reception based on the D2D communications may have an influence on uplink signal transmission to the base station 200 and downlink signal reception from the base station 200 based on the WAN communications. Thus, the inference may occur when the D2D communications and WAN communications coexist.

Figure 13A:
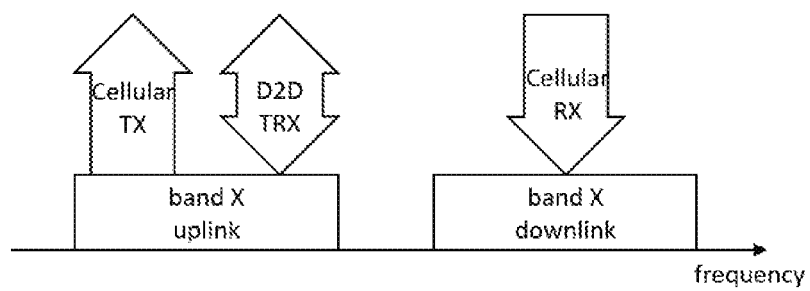
Figure 13B:
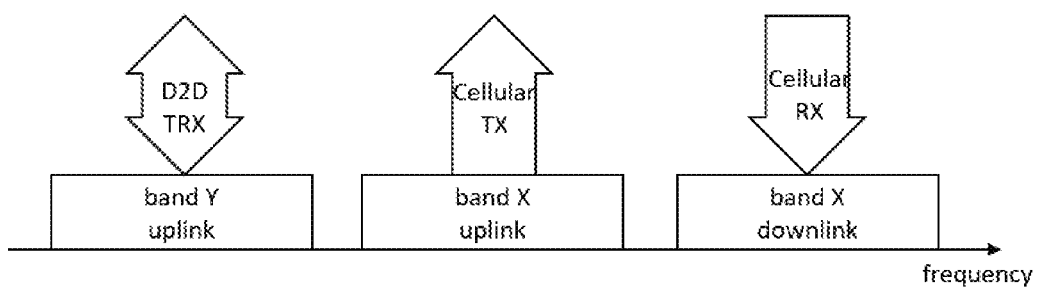
FIG. 13B illustrates one example where D2D communications and WAN communications bands have an inter-band relationship.

FIG. 13A illustrates one example where D2D communications and WAN communications bands are the same as each other, while FIG. 13B illustrates one example where D2D communications and WAN communications bands have an inter-band relationship.

As shown in FIG. 13A, the WAN communications may perform transmission of an uplink signal using an uplink band, and may perform reception of a downlink signal using a downlink band. The D2D communications may perform transmission and reception of signals between the UEs using the same band as the uplink band of the WAN communications. Alternatively, as shown in FIG. 13B, the D2D communications may perform transmission and reception of signals between the UEs using an inter-band different from the uplink band of the WAN communications.

Figure 14A:
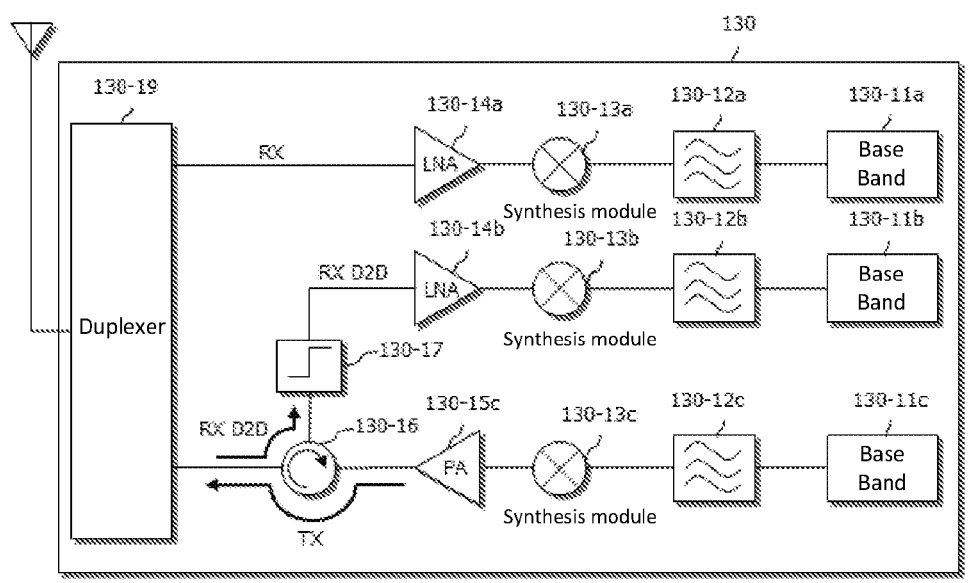
FIG. 14A and FIG. 14B illustrate an existing RF architecture for supporting both WAN communications and D2D communications.
Figure 14B:
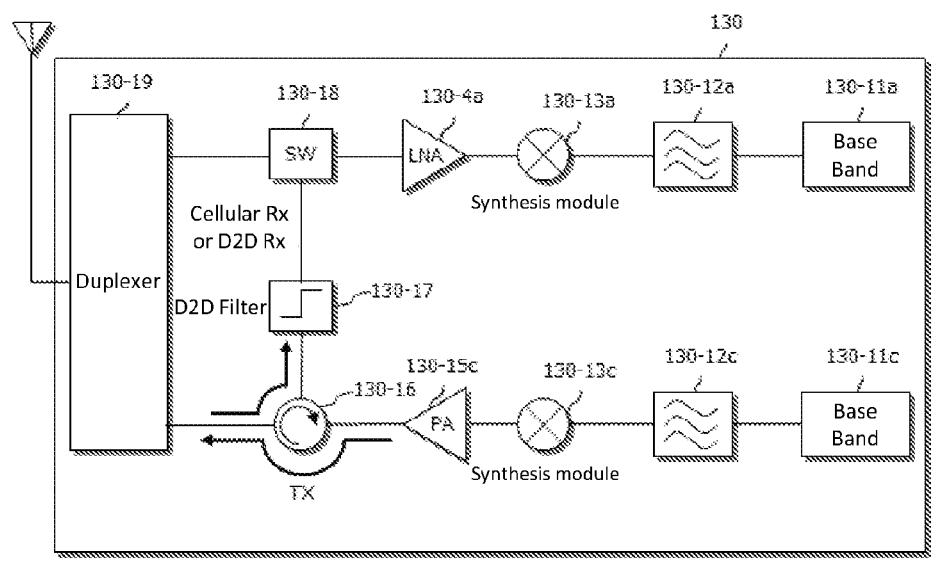

FIG. 14A and FIG. 14B illustrate an existing RF architecture for supporting both WAN communications and D2D communications.

FIG. 14A shows the RF architecture 130 which may include a first RF chain to process a WAN based reception signal, a second RF chain to process a D2D based reception signal, and a third RF chain to process a D2D transmission signal or WAN transmission signal based on a TDM (Time division multiplexing) scheme. Each of the first RF chain and third RF chain may employ an existing RF chain for the WAN communications. That is, the third RF chain may send a signal for the D2D communications using the existing RF chain for the WAN communications.

The first RF chain to process the WAN based reception signal may include a first baseband module 130-11a for WAN based reception, a first filter 130-12a, a first synthesis module 130-13a configured to remove a first carrier fc1 and output an intermediate frequency, and a first LNA (Low Noise Amplifier) 130-14a.

The second RF chain to process the D2D based reception signal may include a second baseband base band module 130-11b configured to convert a D2D based reception signal to a baseband signal, a second filter 130-12b, a second synthesis module 130-13b configured to remove a second carrier fc2 and to output an intermediate frequency, and a second LNA 130-14b.

The third RF chain to process the D2D based transmission signal and WAN based transmission signal may include a third baseband base band module 130-11c for D2D based or WAN based transmission, a third filter 130-12c, a third synthesis module 130-13c to configure the filtered signal with a carrier, and a PA (Power Amplifier) 130-15c.

The first RF chain and the third RF chain may be coupled to a duplexer 130-19. In this connection, the duplexer 130-19 may be configured to distribute WAN transmission and reception signals to one of the first RF chain and, third RF chain. Further, the duplexer 130-19 may be configured to the transmission signal from the third RF chain to an antenna. Between the PA 130-15c of the third RF chain and duplexer 130-19, a directional coupler or switch 130-16 may be disposed. The directional coupler or switch 130-16 may be configured to separate D2D transmission Tx and D2D reception Rx from each other.

An operation of the RF architecture 130 as shown in FIG. 14A may be as follows: The directional coupler or switch 130-16 may send a signal from the PA 130-15c of the third RF chain to the duplexer 130-19, and send a D2D input signal from the duplexer 130-19 to the interference cancellation filter 130-17. The interference cancellation filter 130-17 may be configured to perform filtering operation such that a signal from the PA 130-15c of the third RF chain may leak into the second RF chain to suppress self-interference. Further, the interference cancellation filter 130-17 may be configured to perform filtering operation such that when the D2D reception signal from the antenna is input via the duplexer thereto, interference from an adjacent signal is filtered away.

FIG. 14B shows a RF architecture 130 which may be configured to support D2D transmission and reception using existing RF chains for the WAN communications without addition of a separate RF chain for the D2D communications. The RF architecture 130 as shown in FIG. 14B may include a first RF chain configured to support D2D reception or WAN reception based on a TDM scheme, and a third RF chain configured to support D2D transmission or WAN transmission D2D based on a TDM scheme. That is, it may dispense with the second RF chain as in FIG. 14A.

Further, between the duplexer 130-19 and the first LNA 130-14a of the first RF chain, a switch 130-18 may be disposed. Between the duplexer 130-19 and the PA 130-15c of the third RF chain, a directional coupler or switch 130-16 may be disposed. Furthermore, between the switch 130-18 of the first RF chain and the directional coupler or switch 130-16 of the third RF chain, an interference cancellation filter 130-17 may be disposed.

The Present Disclosure

As described above, when a first UE to perform D2D communications including signal direct transmission and reception between UEs is adjacent to a second UE to perform WAN communications including signal transmission and reception between a base station and the second UE, the D2D communications and WAN communications may undesirably interfere with each other. Thus, in accordance with the present disclosure, there is provided a RF (Radio Frequency) architecture to minimize the interference between the UEs to perform the D2D communications and WAN communications and thus allow smooth communications therebetween. In particular, in accordance with the present disclosure, there is provided a RF architecture configured to support efficient WAN communications and D2D communications when one UE may not only support carrier aggregation (CA) for a multiple component carrier support but also support the D2D communications.

Hereinafter, for the sake of convenience of illustration of the RF architecture in accordance with the present disclosure, constraints and associated several scenarios for performance of the WAN communications and D2D communications will be assumed as follows:

A following table 3 illustrates feasibility of each of scenarios based on various conditions (availability of each of WAN communication and D2D communication, availability of each of band sharing (co-band) and/or channel sharing (co-channel), collision occurrence) for a UE to support a single component carrier (SCC):

TABLE 3

| SCENARIO NO | WAN | D2D | CARRIER FREQUENCY | | | FEASIBILITY SINGLE COMPONENT CARRIER | | |
|---|---|---|---|---|---|---|---|---|
| | | | BAND SHARING | CHANNEL SHARING | COLLISION | NON-CA UE | 2DL/1UL UE | 2DL/2UL UE |
| A1 | OFF | OFF | | | x | ○ | ○ | ○ |
| A2 | RX | OFF | ○ | ○ | x | ○ | ○ | ○ |
| A3 | TX | OFF | ○ | ○ | x | ○ | ○ | ○ |
| A4 | TRX | OFF | ○ | ○ | x | ○ | ○ | ○ |
| A5 | OFF | TX | ○ | ○ | x | ○ | ○ | ○ |
| A6 | OFF | RX | ○ | ○ | x | ○ | ○ | ○ |
| A7 | RX | TX | ○ | ○ | x | ○ | ○ | ○ |
| A8 | RX | RX | ○ | ○ | x | x | ○ | ○ |
| A9 | TX | TX | ○ | ○ | ○ | — | — | — |
| A10 | TX | RX | ○ | ○ | ○ | — | — | — |
| A11 | TRX | TX | ○ | ○ | ○ | — | — | — |
| A12 | TRX | RX | ○ | ○ | ○ | — | — | — |

The RF architecture 130 as shown in FIG. 14B may operate as follows: the directional coupler or switch 130-16 may deliver a signal from the PA 130-15c of the third RF chain to the duplexer 130-19 and may deliver a D2D input signal from the duplexer 130-19 to the interference cancellation filter 130-17.

Following table 4 and table 5 each illustrates feasibility of each of scenarios based on various conditions (availability of each of WAN communication and D2D communication, availability of each of band sharing (co-band) and/or channel sharing (co-channel), collision occurrence) for a UE to support a multiple component carrier (MCC):

TABLE 4

| SCENARIO NO. | WAN | D2D | CARRIER FREQUENCY | | | FEASIBILITY MULTIPLE COMPONENT CARRIER | | |
|---|---|---|---|---|---|---|---|---|
| | | | BAND SHARING | CHANNEL SHARING | COLLISION | NON-CA UE | 2DL/1UL UE | 2DL/2UL UE |
| B1 | OFF | OFF | | | x | ○ | ○ | ○ |
| B2 | RX | OFF | ○ | x | x | ○ | ○ | ○ |
| B3 | TX | OFF | ○ | x | x | ○ | ○ | ○ |
| B4 | TRX | OFF | ○ | x | x | ○ | ○ | ○ |

TABLE 4-continued

| SCENARIO NO. | WAN | D2D | CARRIER FREQUENCY | | | FEASIBILITY MULTIPLE COMPONENT CARRIER | | |
|---|---|---|---|---|---|---|---|---|
| | | | BAND SHARING | CHANNEL SHARING | COLLISION | NON-CA UE | 2DL/1UL UE | 2DL/2UL UE |
| B5  | OFF | TX  | o | x | x | o | o | o |
| B6  | OFF | RX  | o | x | x | o | o | o |
| B7  | RX  | TX  | o | x | x | o | o | o |
| B8  | RX  | RX  | o | x | x | x | o | o |
| B9  | TX  | TX  | o | x | x | x | x | o |
| B10 | TX  | RX  | o | x | x | x | o | o |
| B11 | TRX | TX  | o | x | x | x | x | o |
| B12 | TRX | RX  | o | x | x | x | o | o |

TABLE 5

| SCENARIO NO. | WAN | D2D | CARRIER FREQUENCY | | | FEASIBILITY MULTIPLE COMPONENT CARRIER | | |
|---|---|---|---|---|---|---|---|---|
| | | | BAND SHARING | CHANNEL SHARING | COLLISION | NON-CA UE | 2DL/1UL UE | 2DL/2UL UE |
| C1  | OFF | OFF |   |   | x | o | o | o |
| C2  | RX  | OFF | x | x | x | o | o | o |
| C3  | TX  | OFF | x | x | x | o | o | o |
| C4  | TRX | OFF | x | x | x | o | o | o |
| C5  | OFF | TX  | x | x | x | o | o | o |
| C6  | OFF | RX  | x | x | x | o | o | o |
| C7  | RX  | TX  | x | x | x | o | o | o |
| C8  | RX  | RX  | x | x | x | x | o | o |
| C9  | TX  | TX  | x | x | x | x | x | o |
| C10 | TX  | RX  | x | x | x | x | o | o |
| C11 | TRX | TX  | x | x | x | x | x | o |
| C12 | TRX | RX  | x | x | x | x | o | o |

Figure 15:
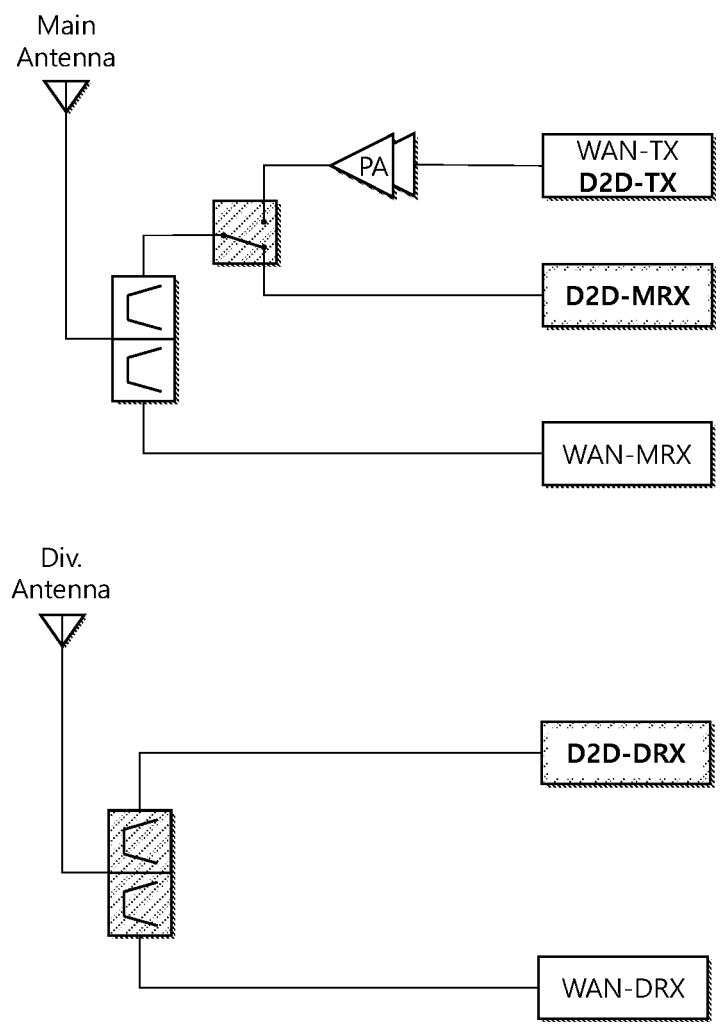
FIG. 15 to FIG. 19 illustrate respectively a first RF architecture, a second RF architecture, a third RF architecture, a fourth RF architecture, and a fifth RF architecture for supporting both WAN communications and D2D communications.

FIG. 15 illustrates a first RF architecture to support WAN communications and D2D communications in accordance with the present disclosure.

Referring to FIG. 15, in the first RF architecture, an additional dedicated path for a D2D based reception signal (D2D-RX) may be added into a RFIC (Radio-Frequency Integrated Circuit). The first RF architecture may include a main antenna and a diversity antenna.

The first RF architecture may include a first RF chain configured to process a WAN based transmission signal (WAN-TX) or a D2D based transmission signal (D2D-TX) to be transmitted via the main antenna; a second RF chain configured to process a D2D based main reception signal (D2D-MRX) received via the main antenna; and a third RF chain configured to process a WAN based main reception signal (WAN-MRX) received via the main antenna. The first RF architecture may further include a fourth RF chain configured to process a D2D based diversity reception signal (D2D-DRX) received via the diversity antenna, and a fifth RF chain configured to process a WAN based diversity reception signal (WAN-DRX) received via the diversity antenna.

The first chain of the first RF architecture may include a PA (power amplifier) configured to amplify the WAN-TX or D2D-TX to be transmitted via the main antenna. The first RF architecture may include a first duplexer between the switch, third chain and main antenna. The duplexer may be configured to separate a transmission-purposed band, a reception-purposed band, a WAN communications-purposed band and a D2D communications-purposed band from each other. In particular, in order to add the dedicated path for the D2D-RX into the RFIC, the first RF architecture in accordance with the present disclosure may further include a switch between the first RF chain and second RF chain for the main antenna, wherein the switch may be configured to operate based on a TDD (Time Division Duplex) scheme. Further, in order to process the WAN-RX and D2D-RX simultaneously, the first RF architecture may include a second duplexer between the fourth chain, fifth chain and diversity antenna, wherein the second duplexer may be configured to separate a WAN communications-purposed band and D2D communications-purposed band. The first RF architecture may include one of a quadplxer, a triplexer and a hexplexer instead of the duplexer based on aggregated bands according to carrier aggregation. A transceiving frequency of the D2D communications is limited to operating bands of the D2D communications.

The first RF architecture may have increased design complexity due to the addition of the dedicated path for the D2D-RX. Further, the first RF architecture may have increased electric consumption of the PA included in the first RF chain due to the addition of the switch between the first RF chain and second RF chain for the main antenna. In accordance with the first RF architecture, simultaneous performance of the WAN-RX and D2D-RX, simultaneous performance of the WAN-RX and D2D-TX, and simultaneous performance of the WAN-TRX and D2D-TX may be possible. Furthermore, when determining whether each of the scenario tables as illustrated in the table 3 to table to 5 could be applied to the first RF architecture, the A1 to A8 scenarios, B1 to B9 scenarios, B11 scenarios, and C1 to C12 scenarios may be applied to the first RF architecture.

The above-described first RF architecture may have characteristics as defined from a following table 6:

TABLE 6

| Advantage/disadvantage | WAN communications and D2D communications | Possible scenario |
| --- | --- | --- |
| Increased design RFIC complexity Increased power consumption of PA | Simultaneous performance of WAN-RX and D2D-RX Simultaneous performance of WAN-RX and D2D-TX Simultaneous performance of WAN-TRX and D2D-TX | A1 to A8 B1 to B9, B11 C1 to C12 |

Figure 16:
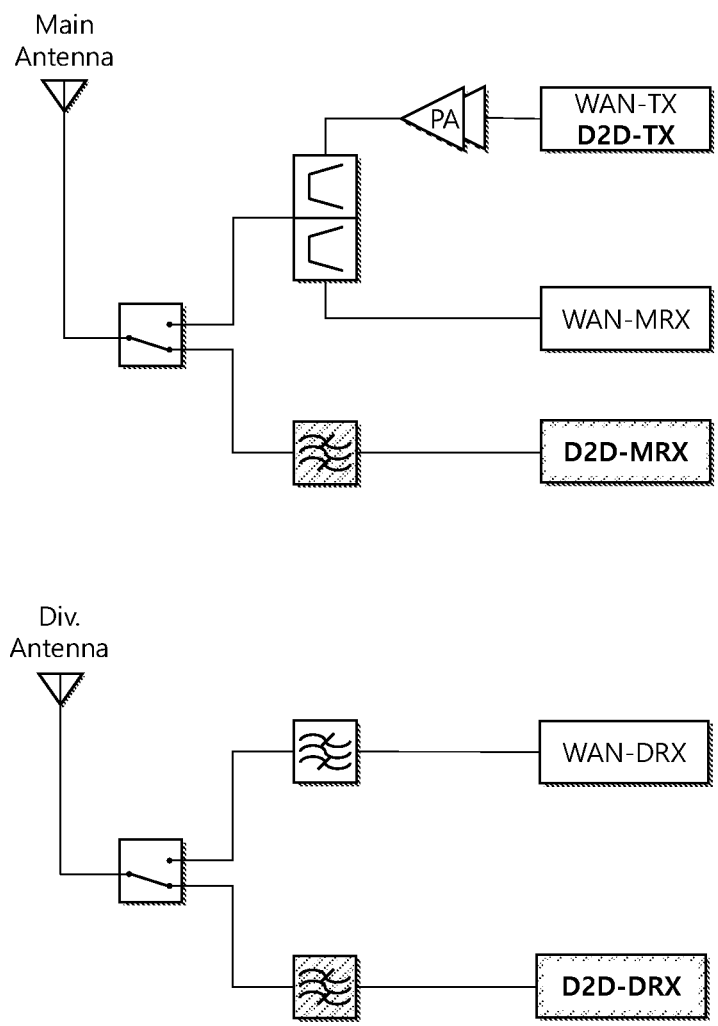

FIG. 16 illustrates a second RF architecture to support WAN communications and D2D communications in accordance with the present disclosure.

Referring to FIG. 16, in the second RF architecture, an additional dedicated path for a D2D based reception signal (D2D-RX) may be added into a RFIC (Radio-Frequency Integrated Circuit). This aspect may be similar to the above first RF architecture. The second RF architecture may include a main antenna and a diversity antenna.

The second RF architecture may include a first RF chain configured to process a WAN based transmission signal (WAN-TX) or a D2D based transmission signal (D2D-TX) to be transmitted via the main antenna; a second RF chain configured to process a WAN based main reception signal (WAN-MRX) received via the main antenna; and a third RF chain configured to process a D2D based main reception signal (D2D-MRX) received via the main antenna. The second RF architecture may further include a fourth RF chain configured to process a WAN based diversity reception signal (WAN-DRX) received via the diversity antenna, and a fifth RF chain configured to process a D2D based diversity reception signal (D2D-DRX) received via the diversity antenna.

The second RF architecture is easy to support carrier aggregation on the TDD. However, the second RF architecture may have increased design complexity due to the addition of the dedicated path for the D2D-RX. In accordance with the second RF architecture, simultaneous performance of the WAN-RX and D2D-TX, and the simultaneous performance of the WAN-TRX and D2D-TX may be possible. However, the simultaneous performance of the WAN-RX and D2D-RX may be not possible. Furthermore, when determining whether each of the scenario tables as illustrated in the table 3 to table to 5 could be applied to the second RF architecture, the A1 to A7 scenarios, B1 to B7 scenarios, B9 and B11 scenarios, and C1 to C12 scenarios may be applied to the first second architecture.

The above-described second RF architecture may have characteristics as defined from a following table 7:

TABLE 7

| Advantage/disadvantage | WAN communications and D2D communications | Possible scenario |
| --- | --- | --- |
| Increased RFIC design complexity Easy to support carrier aggregation on the TDD | Simultaneous performance of WAN-RX and D2D-TX simultaneous performance of WAN-TRX and D2D-TX | A1 to A7 B1 to B7, B9, B11 C1 to C12 |

Figure 17:
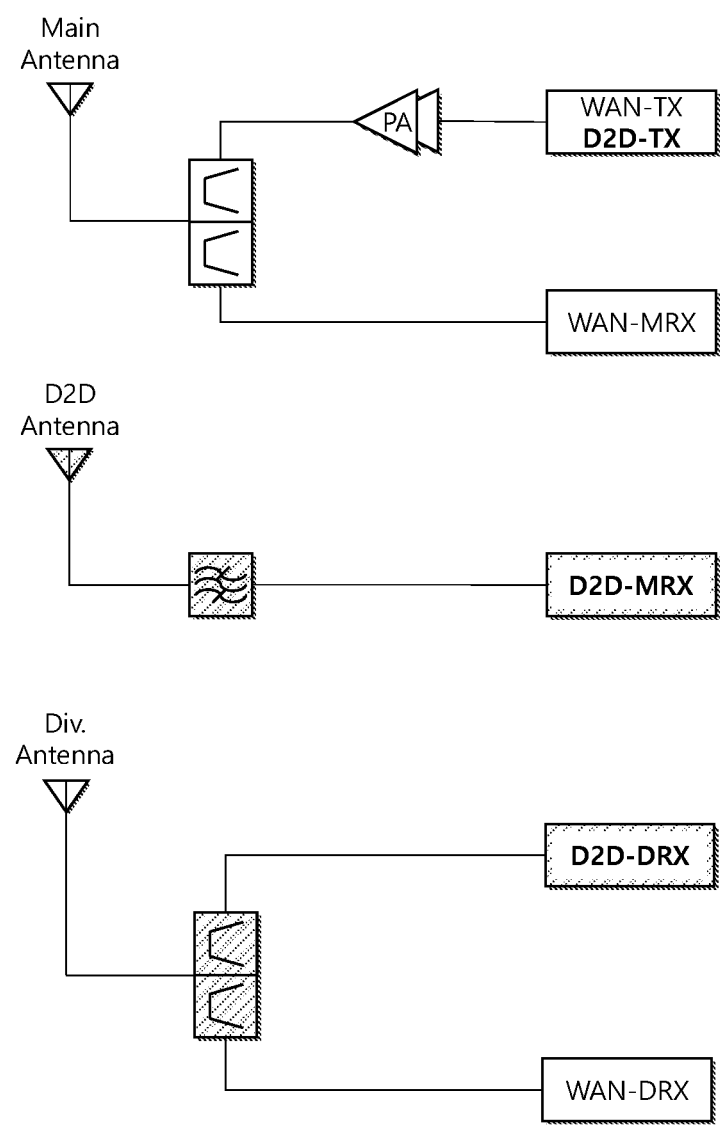

FIG. 17 illustrates a third RF architecture to support WAN communications and D2D communications in accordance with the present disclosure.

Referring to FIG. 17, in the third RF architecture, an additional dedicated path for a D2D based reception signal (D2D-RX) may be added into a RFIC (Radio-Frequency Integrated Circuit). This aspect may be similar to the above first RF architecture. However, the third RF architecture may further include an additional D2D antenna for simultaneous performance of the WAN-TRX and D2D-RX. That is, the third RF architecture may have the D2D antenna in addition to the main antenna and diversity antenna.

The third RF architecture may include a first RF chain configured to process a WAN based transmission signal (WAN-TX) or a D2D based transmission signal (D2D-TX) to be transmitted via the main antenna; and a second RF chain configured to process a WAN based main reception signal (WAN-MRX) received via the main antenna. The third RF architecture may further include a third RF chain configured to process a D2D based diversity reception signal (D2D-DRX) received via the diversity antenna, and a fourth RF chain configured to process a WAN based diversity reception signal (WAN-DRX) received via the diversity antenna. The third RF architecture may further include a fifth RF chain configured to process a D2D based main reception signal (D2D-MRX) received via the additional D2D antenna.

The third RF architecture may have increased design complexity due to the addition of the dedicated path for the D2D-RX. Further, the third RF architecture may have an increased complexity of a RF front-end structure thereof due to the addition of the D2D antenna. In accordance with the third RF architecture, simultaneous performance of the WAN-RX and D2D-RX, simultaneous performance of WAN-RX and D2D-TX, simultaneous performance of WAN-TRX and D2D-RX (except for band sharing (co-band) and channel sharing (co-channel)), and simultaneous performance of WAN-TRX and D2D-TX (except for band sharing, channel sharing and 2UL) may be possible. Furthermore, when determining whether each of the scenario tables as illustrated in the table 3 to table to 5 could be applied to the third RF architecture, the A1 to A8 scenarios, B1 to B12 scenarios, and C1 to C12 scenarios may be applied to the third second architecture.

The above-described third RF architecture may have characteristics as defined from a following table 8:

TABLE 8

| Advantage/disadvantage | WAN communications and D2D communications | Possible scenario |
| --- | --- | --- |
| Increased RFIC design complexity Increased complexity of RF front-end structure | Simultaneous performance of WAN-RX and D2D-RX Simultaneous performance of WAN-RX and D2D-TX simultaneous performance of WAN-TRX and D2D-RX (except for co-band and co-channel) Simultaneous performance of WAN-TRX and D2D-TX(except for co-band, co-channel, 2UL) | A1 to A8 B1 to B12 C1 to C12 |

Figure 18:
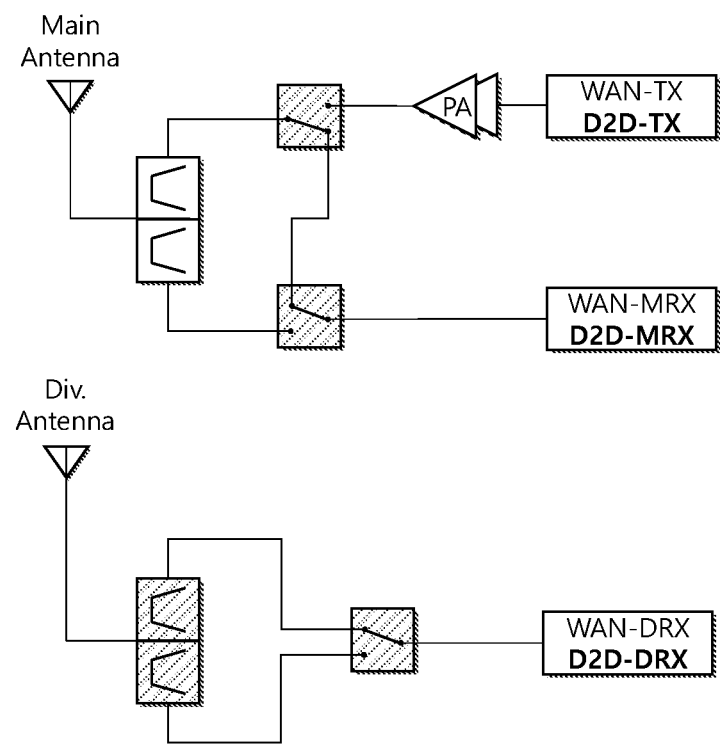

FIG. 18 illustrates a fourth RF architecture to support WAN communications and D2D communications.

Referring to FIG. 18, in the fourth RF architecture, each WAN-RX module of a RFIC may be reconfigured to support D2D-RX operation.

The fourth RF architecture may include first RF chain configured to process the WAN-TX and D2D-TX to be transmitted via the main antenna; and a second RF chain configured to process the WAN-MRX and D2D-MRX received via the main antenna. The fourth RF architecture may further include a third RF chain configured to process the WAN-DRX and D2D-DRX received via the diversity antenna.

The fourth RF architecture may not change an overall design architecture of the existing RFIC. However, the fourth RF architecture may further include a switch, thus leading to increased power consumption of the PA and increased RX noise. Using the fourth RF architecture, simultaneous performance of the WAN-RX and D2D-TX, and simultaneous performance of the WAN-TRX and D2D-TX may be possible. When determining whether each of the scenario tables as illustrated in the table 3 to table to 5 could be applied to the fourth RF architecture, A1 to A7 scenario, B1 to B7 scenario, B9 scenario, B11 scenario, and C1 to C12 scenarios may be applied to the fourth RF architecture. It is necessary to support the WAN-RX and D2D-RX simultaneously for smooth operating in an environment comprising a heavy data traffic. However, in accordance with the fourth RF architecture, simultaneous performance of the WAN-RX and D2D-RX may be not possible.

The above-described fourth RF architecture may have characteristics as defined from a following table 9:

TABLE 9

| Advantage/disadvantage | WAN communications and D2D communications | Posible scenario |
| --- | --- | --- |
| Unchanged design of existing RFIC Increased power consumption of PA Increased RX noise Non-simultaneous performance of WAN-RX and D2D-RX | Simultaneous performance of WAN-RX and D2D-TX Simultaneous performance of WAN-TRX and D2D-TX | A1 to A7 B1 to B7, B9, B11 C1 to C12 |

Figure 19:
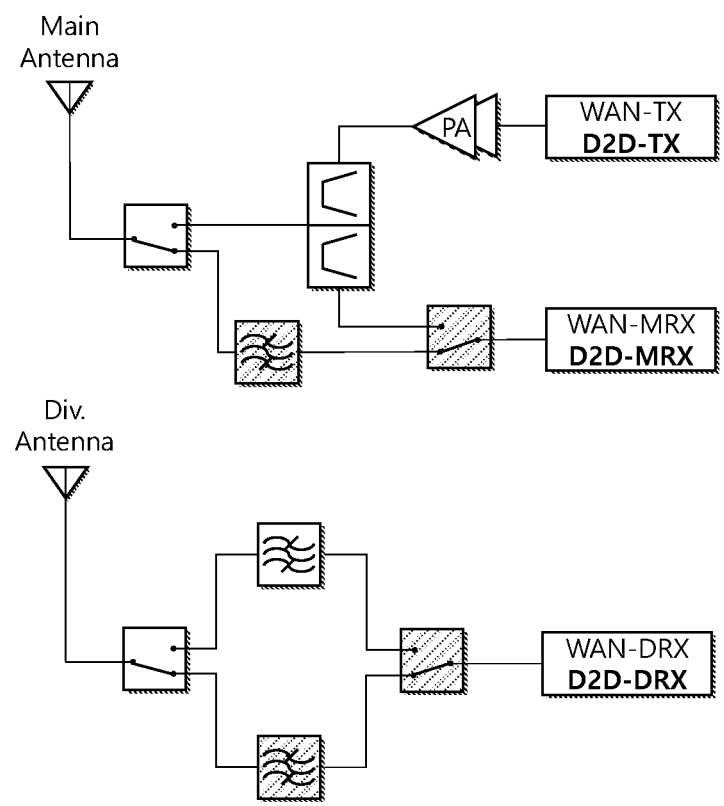

FIG. 19 illustrates a fifth RF architecture to support the WAN communications and D2D communications.

be disposed not between the PA and duplexer, but between the duplexer and main antenna.

The fifth RF architecture may not change an overall design architecture of the existing RFIC. Since as described above, the switch is disposed not between the PA and duplexer, but between the duplexer and main antenna, the increase of the power consumption in the PA may be suppressed. However, due to the addition of the switch, the fifth RF architecture may have increased RX noise.

Using the fifth RF architecture, simultaneous performance of the WAN-RX and D2D-TX, and simultaneous performance of the WAN-TRX and D2D-TX may be possible. When determining whether each of the scenario tables as illustrated in the table 3 to table to 5 could be applied to the fifth RF architecture, A1 to A7 scenario, B1 to B7 scenario, B9 scenario, B11 scenario and C1 to C12 scenario may be applied to the fifth RF architecture. However, in accordance with the fifth RF architecture, simultaneous performance of the WAN-RX and D2D-RX may be not possible like the fourth RF architecture. The above-described fifth RF architecture may have characteristics as defined from a following table 10:

TABLE 10

| Advantage/disadvantage | WAN communications and D2D communications | Possible scenario |
| --- | --- | --- |
| Unchanged design of existing RFIC Increased RX noise Non-simultaneous performance of WAN-RX and D2D-RX | Simultaneous performance of WAN-RX and D2D-TX Simultaneous performance of WAN-TRX and D2D-TX | A1 to A7 B1 to B7, B9, B11 C1 to C12 |

Comparisons between the above first RF architecture to fifth RF architecture may be made with reference to a following table 11:

TABLE 11

| 3GPP Spec | D2D carrier | scenario No. | first RF architecture | second RF architecture | third RF architecture | fourth RF architecture | fifth RF architecture |
| --- | --- | --- | --- | --- | --- | --- | --- |
| Rel. 12 | band sharing and channel sharing | A1-A7 | o | o | o | o | o |
| | | A8 | o | x | o | x | x |
| Rel. 13 | band sharing and different channel | B1-B7 | o | o | o | o | o |
| | | B8 | o | x | o | x | x |
| | | B9 | o | o | o | o | o |
| | | B10 | x | x | o | x | x |
| | | B11 | o | o | o | o | o |
| | | B12 | x | x | o | x | x |
| | inter-band | C1-C12 | o | o | o | o | o |

Referring to FIG. 19, in the fifth RF architecture, each WAN-RX module of a RFIC may be reconfigured to support D2D-RX operation wherein this reconfiguration may be different from that in the fourth RF architecture as shown in FIG. 18.

The fifth RF architecture may include a first RF chain configured to process the WAN-TX and D2D-TX to be transmitted via the main antenna; and a second RF chain configured to process the WAN-MRX and D2D-MRX received via the main antenna. The fifth RF architecture may include a third RF chain configured to process the WAN-DRX and D2D-DRX received via the diversity antenna. However, for the fifth RF architecture, in order to suppress increase of the power consumption in the PA, the switch may As indicated in the table 11, the first RF architecture or third RF architecture may be relatively effective with respect to the scenarios applicable to the UE to support the multiple component carrier (MCC).

However, the third RF architecture may not be suitable for an actual implementation in terms of a size and power consumption of the RFIC due to the additions of the dedicated antenna and RF chain for the D2D communications. To the contrary, the first RF architecture may support all of the scenarios except for the B10 and B12 scenarios which may not be required in the actual D2D communications environment, and may reuse advantageously the existing RFIC.

Figure 20:
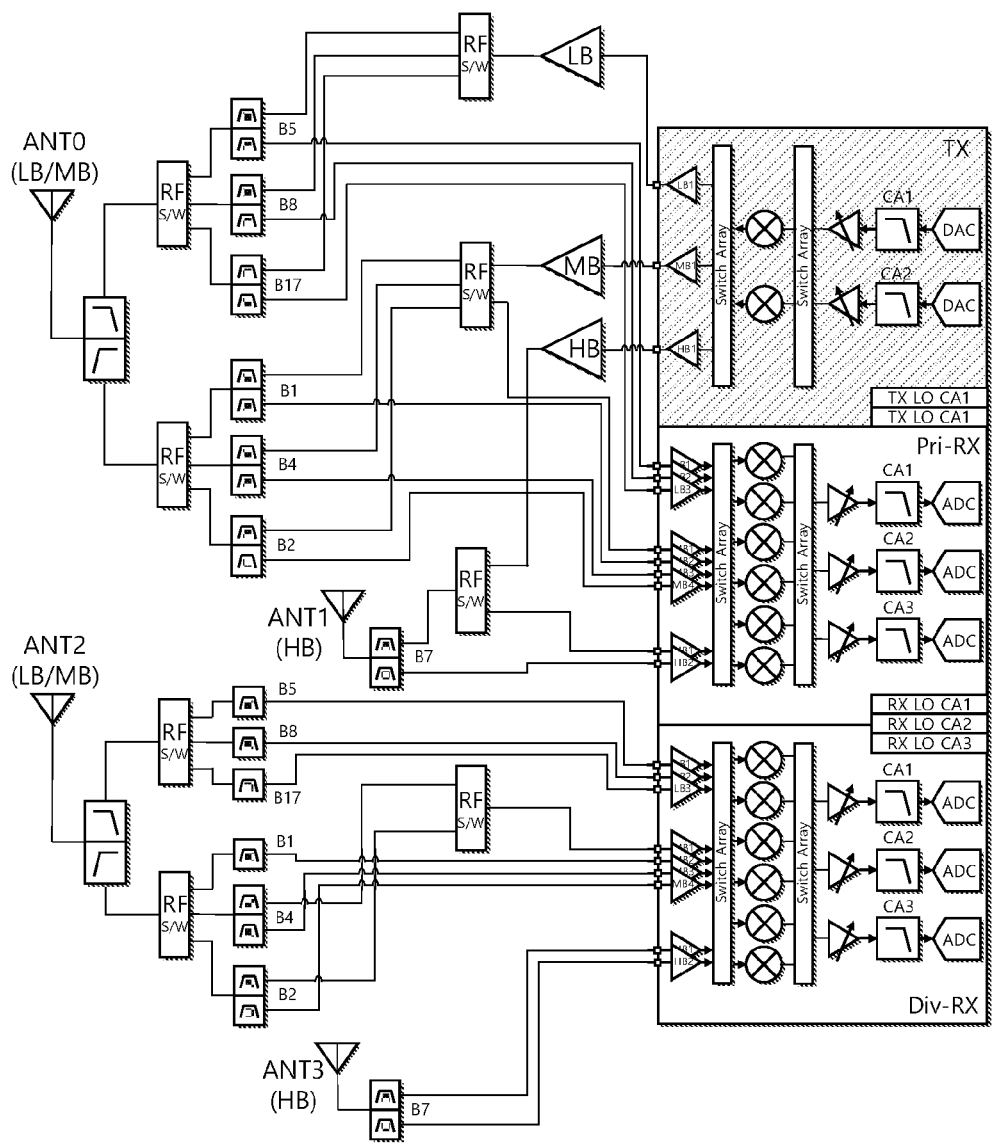
FIG. 20 illustrates one example of an actual RF architecture employing the first RF architecture.

FIG. 20 illustrates one example of an actual RF architecture employing the first RF architecture.

The UE employing the first RF architecture may support 2UL/3UL, inter-carrier aggregation (inter-CA), and intra-contiguous CA with respect to the carrier aggregation (CA). The antenna of the UE employing the first RF architecture may be set in a low/mid band range and high band range. The UE employing the first RF architecture may support the B1, 2, 4, 5, 7, 8, 17 bands as the WAN band and B2, 4, 7 bands as the D2D band. This may be only exemplary. The first RF architecture may be applied to provide different various capabilities. Further, the first RF architecture may include one of a quadplxer, a triplexer and a hexplexer instead of the duplexer based on aggregated bands according to carrier aggregation. A transceiving frequency of the D2D communications is limited to operating bands of the D2D communications.

Embodiment of the present invention may be implemented through various means. For example, the embodiments of the present invention may be implemented by hardware, firmware, software, or a combination thereof.

According to hardware implementation, the method according to the embodiments of the present invention may be implemented using Application Specific Integrated Circuits (ASICs), digital signal processors (DSPs), digital signal processing devices (DSPDs), programmable logic devices (PLDs), field programmable gate arrays (FPGAs), processors, controllers, micro-controllers, microprocessors.

According to firmware or software implementation, the method according to the embodiments of the present invention may be implemented in the form of a module, a procedure or a function to perform the above functions or operation. A software code is stored in a memory unit so that the software code may be driven by a processor. The memory unit may be located inside or outside the processor to exchange data with the processor by various know means.

Figure 21:
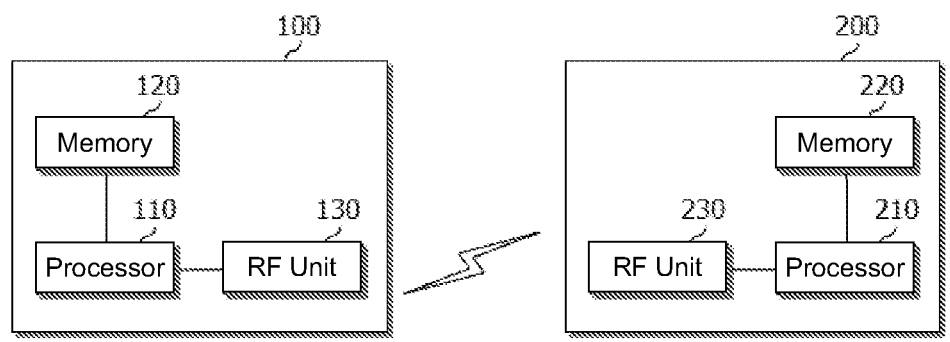
FIG. 21 illustrates a block diagram of a wireless communications system in accordance with one embodiment of the present disclosure.

FIG. 21 is a block diagram illustrating a wireless communication system according to an embodiment of the present invention.

A base station 200 includes a processor 210, a memory 220, and a radio frequency RF unit 230. The memory 220 is connected to the processor 210 to store various information for driving the processor 210. The RF unit 230 is connected to the processor 210 to transmit and/receive a wireless signal. The processor 210 implements a suggested function, procedure, and/or method. An operation of the base station 200 according to the above embodiment may be implemented by the processor 210.

A wireless device 100 includes a processor 110, a memory 110, and an RF unit 130. The memory 120 is connected to the processor 110 to store various information for driving the processor 110. The RF unit 130 is connected to the processor 110 to transmit and/receive a wireless signal. The processor 110 implements a suggested function, procedure, and/or method. An operation of the wireless 100 according to the above embodiment may be implemented by the processor 210.

A processor may include an application-specific integrated circuit (ASIC), another chipset, a logic circuit, and/or a data processor. A memory may include read-only memory (ROM), random access memory (RAM), a flash memory, a memory card, a storage medium, and/or other storage devices. An RF unit may include a baseband circuit to process an RF signal. When the embodiment is implemented, the above scheme may be implemented by a module procedure, function, and the like to perform the above function. The module is stored in the memory and may be implemented by the processor. The memory may be located inside or outside the processor, and may be connected to the processor through various known means.

In the above exemplary system, although methods are described based on a flowchart including a series of steps or blocks, the present invention is limited to an order of the steps. Some steps may be generated in the order different from or simultaneously with the above other steps. Further, it is well known to those skilled in the art that the steps included in the flowchart are not exclusive but include other steps or one or more steps in the flowchart may be eliminated without exerting an influence on a scope of the present invention.

What is claimed is:

1. A wireless device for supporting a first band for LTE (Long Term Evolution)/LTE-A (LTE-Advanced) based cellular communications and a second band for D2D (Device to Device) communications, the device comprising:
   a main antenna;
   a first RF (Radio Frequency) chain configured to process a first transmission signal and a second transmission signal wherein the first and second transmission signals are to be transmitted via the main antenna using uplink bands of the first and second bands respectively;
   a second RF chain configured to process a first reception signal, wherein the first reception signal is received via the main antenna using an uplink band of the second band;
   a third RF chain configured to process a second reception signal, wherein the second reception signal is received via the main antenna using a downlink band of the first band;
   a switch disposed between the first RF chain and the second RF chain for selecting one between the transmission signal associated with the first RF chain and the reception signal associated with the second RF chain; and
   a first duplexer coupled to the switch, the third RF chain and the main antenna for enabling separation between the signal using the first band and the signal using the second band.

2. The device of claim 1, further comprising:
   a diversity antenna;
   a fourth RF chain configured to process a third reception signal wherein the third reception signal is received via the diversity antenna using the uplink band of the second band;
   a fifth RF chain configured to process a fourth reception signal wherein the fourth reception signal is received via the diversity antenna using the downlink band of the first band; and
   a second duplexer coupled to the fourth RF chain, the fifth RF chain and the diversity antenna for enabling separation between the signal using the first band and the signal using the second band.

3. The device of claim 1, further comprising:
   a one of a quadplexer, a triplexer and a hexplexer instead of the second duplexer based on aggregated bands according to carrier aggregation of the cellular communications.

4. The device of claim 1, wherein the switch is configured to operate based on a TDD (Time Division Duplex) scheme.

5. The device of claim 1, wherein the first RF chain include a power amplifier to be configured to amplify the first transmission signal and second transmission signal.

6. The device of claim 1, wherein the uplink band of the second band has an inter-band relationship with the uplink band of the first band.

7. The device of claim 1, wherein each of the second transmission signal and the first reception signal contains a discovery signal on a PSDCH (Physical Sidelink Discovery Channel).

\* \* \* \* \*